United States Patent [19]

Fu

[11] Patent Number: 4,584,453
[45] Date of Patent: Apr. 22, 1986

[54] METHOD AND AN APPARATUS FOR INDUCTIVELY WELDING A FRONT FORK OF BICYCLE

[76] Inventor: Long C. Fu, No. 30-1, Kuang Ming Rd., Wu Jih Hsiang, Tai Chung Hsien, Taiwan

[21] Appl. No.: 698,867

[22] Filed: Feb. 6, 1985

[51] Int. Cl.⁴ .............................................. H05B 6/44
[52] U.S. Cl. .................... 219/10.43; 219/9.5; 219/10.71; 219/10.57; 219/10.79; 219/10.77; 228/154
[58] Field of Search ................... 219/10.41, 10.43, 8.5, 219/9.5, 10.77, 10.75, 10.67, 10.71, 10.57, 66, 61.2, 10.79; 228/154; 280/276, 279; 266/129

[56] References Cited

U.S. PATENT DOCUMENTS 2,359,285 10/1944 Bennett ..................... 219/10.57 X
2,762,892 9/1956 Park .......................... 219/10.43
4,418,258 11/1983 McNealy et al. ........... 219/10.41
4,420,667 12/1983 Lewis ....................... 219/10.77 X
4,501,943 2/1985 Lund ......................... 219/10.77 X Primary Examiner—Philip H. Leung
Attorney, Agent, or Firm—Lane and Aitken

[57] ABSTRACT

The present invention discloses a method for welding the front fork of a bicycle which makes each junctures among the joint, the handlebar, and the fork blades simultaneously reach the melting temperature of a weld metal, so that the weld metal located in the joint evenly distributes over each juncture. The present invention also discloses an apparatus for welding the front fork of a bicycle which utilizes two high-frequency induction coils to heat the front fork respectively from the outer surface and the inner surface of the front fork, and controls the voltage applied to the high-frequency induction coils and the time span of the heating throughout all of the heating and welding procedures.

21 Claims, 14 Drawing Figures

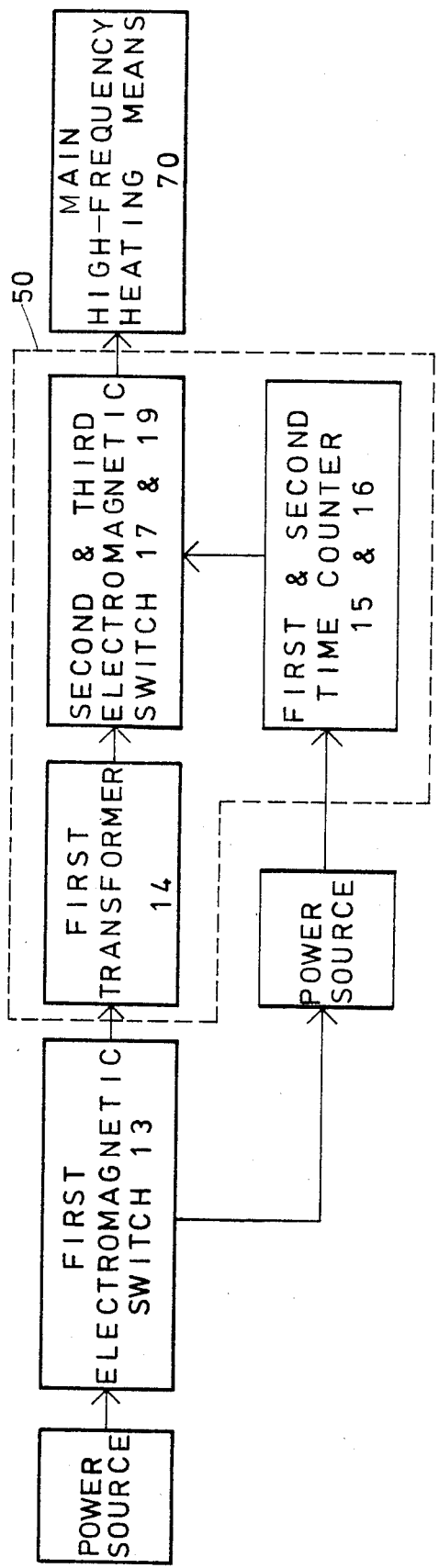
F I G. 5(a)
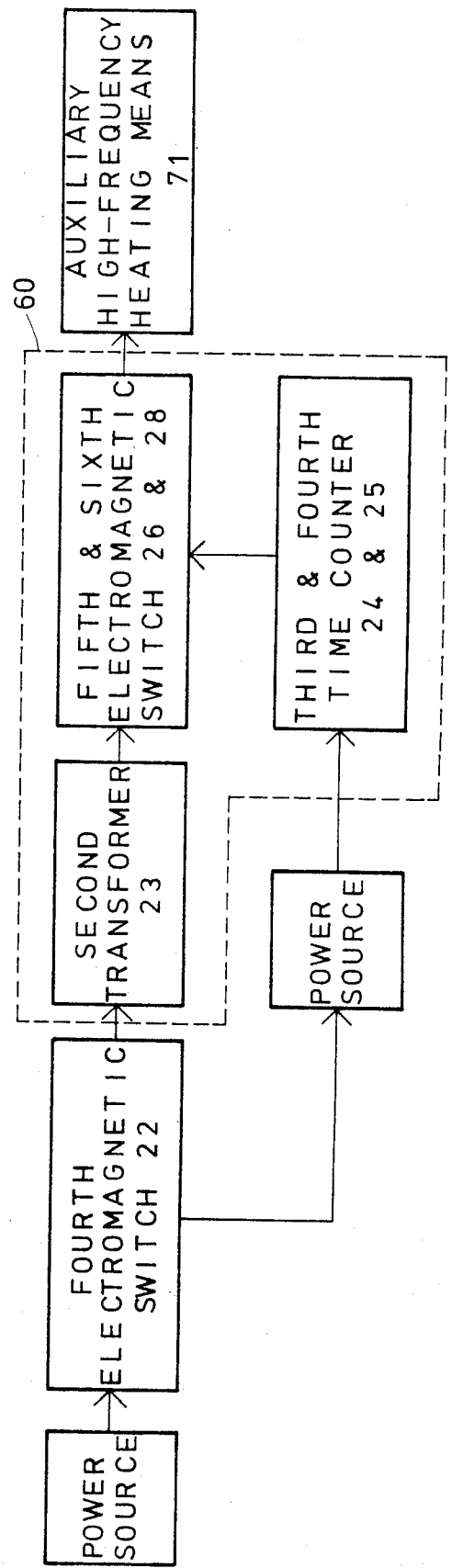
F I G. 5(b)

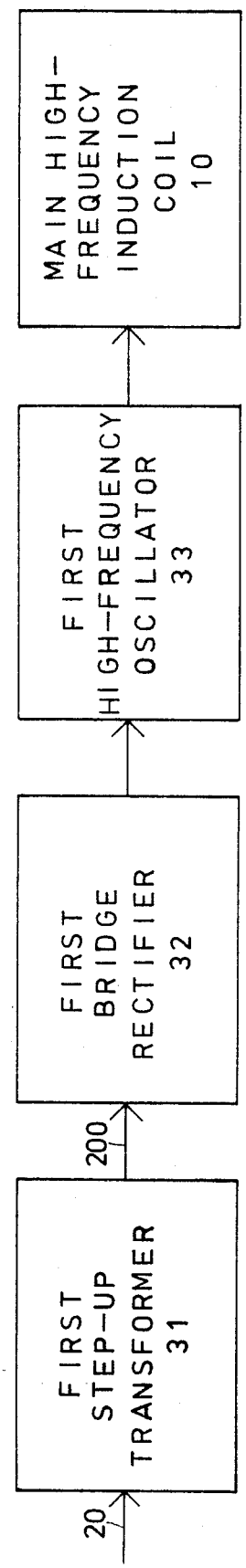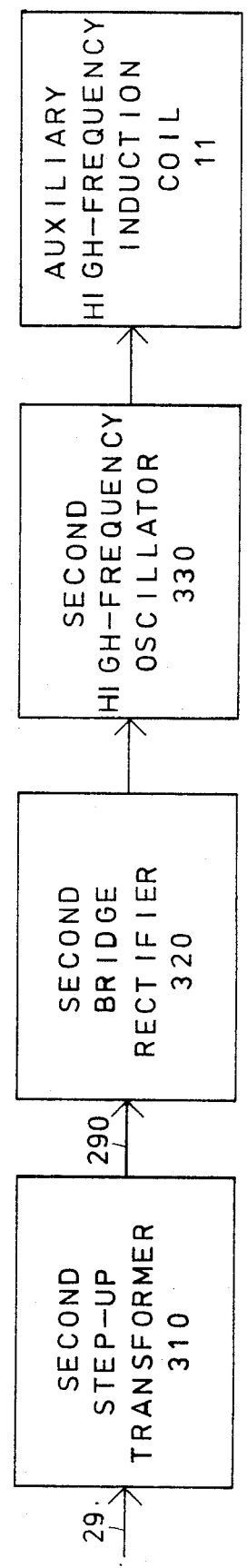
FIG. 7(a)
FIG. 7(b)

METHOD AND AN APPARATUS FOR INDUCTIVELY WELDING A FRONT FORK OF BICYCLE

BACKGROUND OF THE INVENTION

The present invention is related to a method and an apparatus for welding the front fork of a bicycle, and more particularly to a method and an apparatus which utilizes two high-frequency heating means to weld the front fork of the bicycle.

The main structure of the general front fork of a bicycle includes a hollow, substantially rectangular joint having a central bore therethrough and two oval-shaped openings respectively on the opposite sides of the central bore; a hollow handlebar stem with one end fixed into the central bore; and two fork blades with respective one ends fixed into the respective openings. According to the above-described front fork, the other end of the handlebar stem is used to connect with a handlebar of the bicycle, and the respective other ends of the fork blades are used to pivotally connect to the two ends of the hub of the front wheel.

When people ride a bicycle, they usually incline forward and grasp the handlebar grips to support almost the entire weight of their upper body so they can easily propel the bicycle by the action of their feet upon the pedals. Therefore, it is extremely important in a bicycle, especially a road-racing bicycle, that the handlebar, the front fork, and the front wheel are capable of bearing reasonably large loads. If the rider has an accident in which any one of the above-mentioned portions is broken, it will cause the rider to fall down, hitting the ground with his head foremost.

The front fork is the weakest portion of all because it is constructed of three elements jointed together. Those who are ordinarily skilled in the art have done much experimentation trying to make the jointed parts of the front fork stay firmly combined together as one substantially integral part, even during violent vibration and impact. Nowadays, the general method used to achieve this goal is the welding process.

One type of welding process which may be used is electric welding. However, in order to completely seal the junctures in the joint between the crosspiece, the handlebar stem, and the fork blades using an electric welding process, one must use many weld metals and expend a great deal of time. Thus, the spot welding technique, which merely fuses several spot areas of the junctures between the parts, is prevalent among the bicycle manufacturers. Although spot welding is more economical, the stability of the front fork decreases to an extent that is undesirable.

Another one of the welding processes which was developed to solve the above-mentioned problem is copper welding. Its welding procedures include: first placing copper into the hollow crosspiece; inserting the handlebar stem and the fork blades into the openings of the crosspiece properly; and then applying the welding torch to the predetermined positions which one desires to weld. In this method, the copper is first melted due to the fact that its melting temperature is lower than the front fork, and then it begins to flow into the gaps existing in the junctures between the crosspiece, the handlebar stem, and the fork blades as a result of the capillarity effect. Therefore, after the welded portions cool down, the crosspiece, the handlebar, and the fork blades are firmly combined together as an integral part.

Actually, copper welding provides the advantages of security and also saves time. However, unfortunately, the capillarity effect of copper is significantly affected by temperature. If one of the junctures between the crosspiece, the handlebar stem, and the fork blades reaches the melting temperature of the copper before the others, most of the melting copper will flow to that juncture, causing too much copper to accumulate on that juncture so that the copper overflows out of the joint. This overflowing phenomena happens not only when one juncture reaches the melting temperature of copper first, but also whenever the three junctures exist at different temperature conditions. Thus, the overflowing phenomena frequently happens in the manufacturing process of the front fork of the bicycle as a result of the different thicknesses between the tube walls of the handlebar stem and the fork blade. In general, the wall thickness of the handlebar stem is about 2.4 to 2.8 mm, and that of the fork blade is about 1.2 mm. Since the wall thickness of the handlebar stem is at least two times that of the wall thickness of the fork blade, it is difficult in the conventional welding process to control the temperatures of the junctures to maintain equality. Therefore, in many cases, it is necessary to supplement extra copper onto the portions which are not covered by the copper, or to rub out the copper overflow after the welding is finished. Moreover, this situation significantly affects the development of automatic production, the structural strength of the front fork, and the ultimate appearance of the finished bicycle.

The above-described copper welding technique may also utilize a high-frequency heating system to accomplish the heating procedure, which helps reduce the cost of manufacture. However, since the conventional high-frequency heating system uses an induction coil surrounding the outer surface of the front fork for heating therefrom, it contributes to the temperature problem described above, and this problem remains to be solved.

A method and an apparatus for welding the front fork of a bicycle according to the preferred embodiment of the present invention intends to improve upon the abovedescribed disadvantages.

SUMMARY OF THE INVENTION

One object of the present invention is to provide a method for welding the front fork of a bicycle which makes each juncture among the joint, the handlebar, and the fork blades simultaneously reach the melting temperature of a weld metal, so that the weld metal located in the joint evenly distributes itself over each juncture.

Another object of the present invention is to provide an apparatus for welding the front fork of a bicycle which utilizes two high-frequency induction coils to heat the front fork respectively from the outer surface and the inner surface of the front fork, and which controls the voltage applied to the high-frequency induction coils and the time span of the heating throughout all of the heating and welding procedures.

In accordance with the present invention, a method for welding the front fork of a bicycle, which includes a hollow crosspeice at the joint, said crosspiece having a central bore, two end openings thereon, and a weld metal therein, a hollow handlebar stem having its one end less tightly fixed in said bore, and two fork blades having their one ends less tightly fixed in said openings respectively, comprises the steps of applying a main high-frequency heating section to the outer surface of said crosspiece; and applying an auxiliary high-frequency heating section to said joint from the inner surface of said handlebar stem.

In accordance with another aspect of the present invention, an apparatus for welding the front fork of a bicycle, which includes a hollow crosspiece at the joint, said crosspiece having a bore, two openings thereon, and a weld metal therein, a hollow handlebar stem having its one end less tightly fixed in said bore, and two fork blades having their one ends less tightly fixed in said openings respectively, comprises a main high-frequency heating means adapted to be coupled to the power source, and capable of heating said joint from the outer surface of said crosspiece; and an auxiliary high-frequency heating means adapted to be coupled to the power source, and capable of being inserted into the handlebar stem for heating said joint from the inner surface of said handlebar stem.

BRIEF DESCRIPTION OF THE DRAWINGS

The present invention will be more fully understood from the following detailed description, taken in connection with the accompanying drawings which form an integral part of this application and in which:

FIGS. 5(a) and 5(b) are block diagrams of two two-step controlling means which control the voltage transmitted into a main high-frequency heating means and an auxiliary high-frequency heating means;

FIGS. 7(a) and 7(b) are block diagrams of the main and the auxiliary high-frequency heating means according to one preferred embodiment of the present invention;

DETAILED DESCRIPTION OF THE PREFERRED EMBODIMENT

Figure 1:
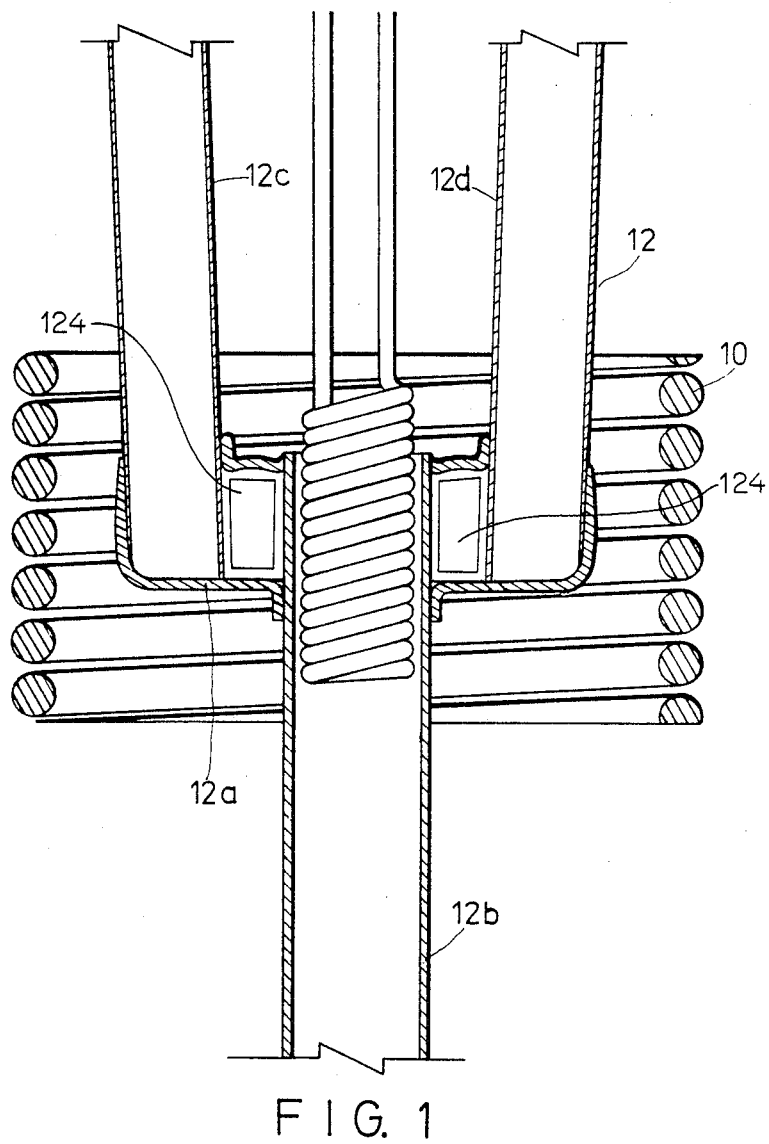
FIG. 1 is a cross sectional view in the vertical direction of a part of the front fork, a main high-frequency induction coil, and an auxiliary high-frequency induction coil according to one preferred embodiment of the present invention, showing the front fork at the heating position.
Figure 2:
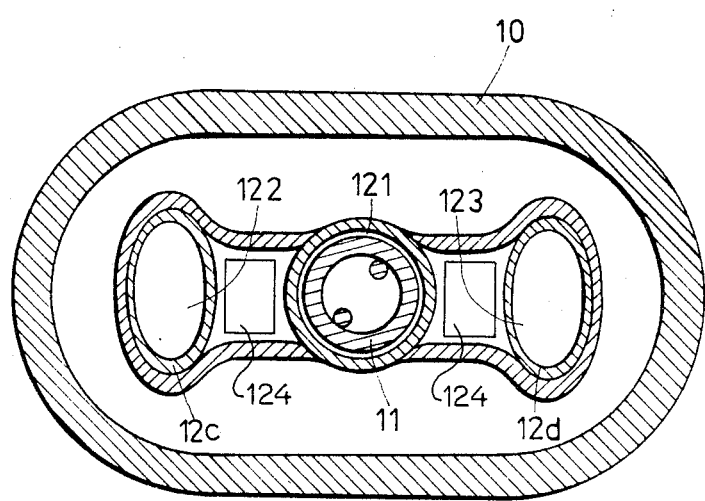
FIG. 2 is a cross sectional view in the horizontal direction of the front fork with the main and auxiliary induction coils, showing the front fork at the heating position.
Figure 3:
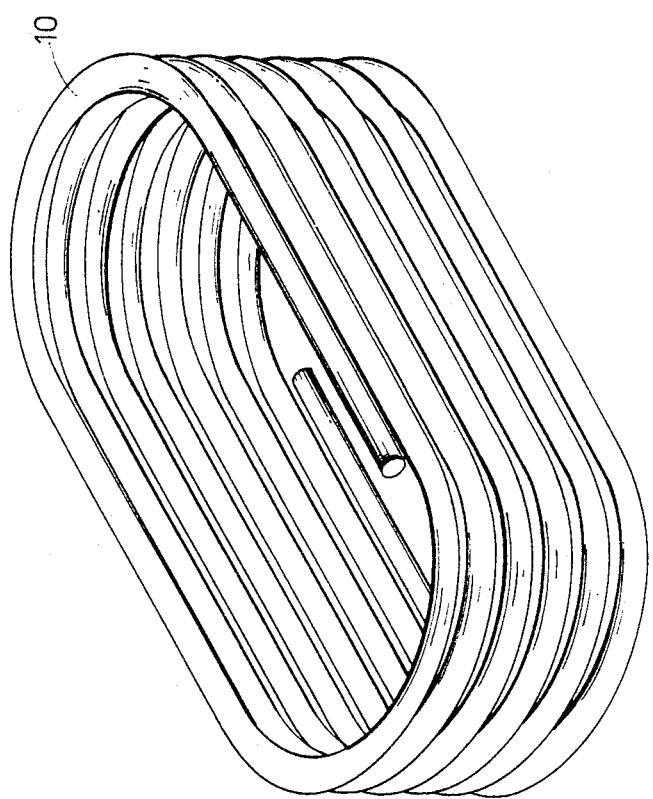
FIG. 3 is a perspective view of the main high-frequency induction coil shown in FIGS. 1 and 2.
Figure 4:
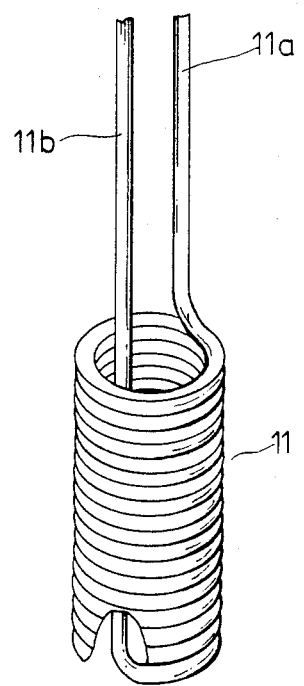
FIG. 4 is a perspective view of the auxiliary high-frequency induction coil with a part cross cut.

Referring now to the drawings, it should be noted that a like member is designated with a like reference number. Referring to FIGS. 1 to 3, a main high-frequency induction coil 10 is formed by several elliptical, spiral turns of wire, especially shown in FIG. 3. Referring to FIGS. 1, 2, and 4, an auxiliary high-frequency induction coil 11 is formed by several circular, spiral turns of wire, and its diameter is smaller than the minor axis of the main high-frequency induction coil 10. Two ends 11a and 11b of the wound wire of the auxiliary high-frequency induction coil 11 are respectively extended upward as shown in FIG. 4. Referring to FIGS. 1 and 2, a front fork 12 of a bicycle includes a hollow crosspiece 12a having a central bore 121 therethrough, two openings 122 and 123 thereon, and a weld metal 124 therein; a hollow handlebar stem 12b having its one end less tightly fixed in the bore 121, and two fork blades 12c and 12d having their one ends less tightly fixed in the openings 122 and 123 respectively. The weld metal 124 located beforehand in the crosspiece 12a may be an alloy of copper, such as a bronze or a brass.

Figure 6:
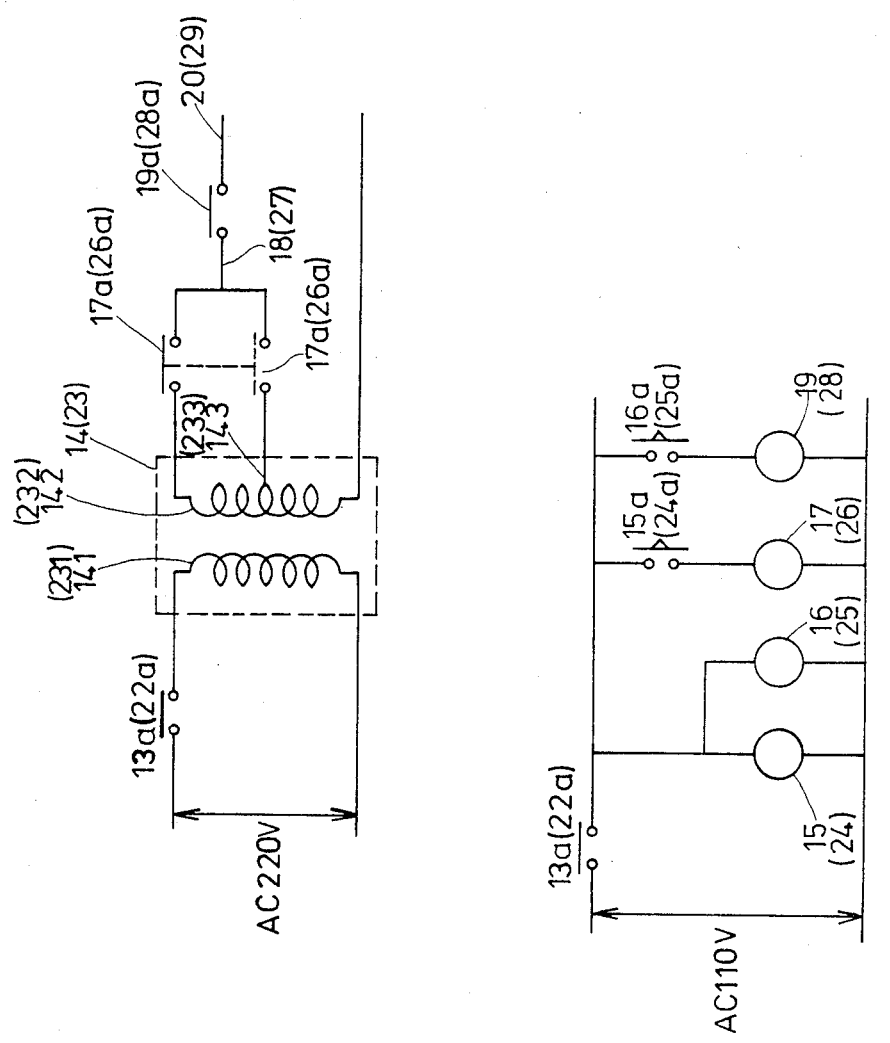
FIG. 6 is an electrical schematic diagram of the two-stepped means shown in FIG. 5.

Referring to FIGS. 5(a), 5(b), and 6, there are shown a first controlling means 50 and a second controlling means 60 coupled to a main high-frequency heating means 70 and an auxiliary high-frequency heating means 71 respectively. The first controlling means 50 includes a first transformer 14, a second electromagnetic switch 17, a third electromagnetic switch 19, a first time counter 15, and a second time counter 16. The second controlling means 60 is similar to the first controlling means 50, also including a second transformer 23, a fifth electromagnetic switch 26, a sixth electromagnetic switch 28, a third time counter 24, and a fourth time counter 25. Thus, in FIG. 6, only a single electric circuit is shown to represent both the first and second controlling means 50 and 60, and the elements of the second controlling means 60 are designated by the parenthetical numbers.

Two contacts 13a of a first electromagnetic switch 13 respectively control a 220 V A.C. power supplyed to the first transformer 14, and concurrently, a 110 V A.C. power supplyed to the first and second time counters 15 and 16. The first transformer 14 has a primary winding 141, a secondary winding 142 with a central tap 143 to transform the 220 V voltage into a first voltage, e.g. 220 V, at the secondary winding 142, and into a second voltage, e.g. 89.8 V, at the central tap 143. The first time counter 15 is set at a first predetermined period, e.g. 15 seconds, and actuates the contact 17a of the second electromagnetic switch 17 to connect with the secondary winding 142 during the first predetermined period. After the first predetermined period, the contact 17a returns to connect with the central tap 143 until the next time the second electromagnetic switch 17 is actuated. The second time counter 16 is set at a predetermined time span of the first predetermined period plus a second predetermined period, e.g. 15 seconds+40 seconds, and actuates the contact 19a of the third electromagnetic switch 19 to make connection between a line 18 and a line 20 during the predetermined time span. After the predetermined time span, the third electromagnetic switch 19 is shut off to disconnect the lines 18 and 20 until the next time they are actuated. Therefore, during the first predetermined period, the voltage transmitted to the main high-frequency heating means 70 through the lines 18 and 20 is the first voltage 220 V, while during the second predetermined period, the voltage transmitted to the main high-frequency heating means is the second voltage 89.8 V.

When the above-mentioned first predetermined period terminates, concurrently, two contacts 22a of a fourth electromagnetic switch 22 respectively control a 220 V A.C. power supply to the third transformer 23, and a 110 V A.C. power supply to the third and fourth time counters 24 and 25. The third transformer 23 has a primary winding 231, a secondary winding 232 with a central tap 233 to transform the 220 V voltage into a third voltage, e.g. 220 V, at the secondary winding 232, and into a fourth voltage, e.g. 73.3 V, at the central tap 233. The third time counter 24 is set at a third predetermined period, e.g. 6 seconds, and actuates the contact 26a of the fifth electromagnetic switch 26 to connect with the secondary winding 232 during the third predetermined period. After the third predetermined period, the contact 26a returns to connect with the central tap 233 until the next time the fifth electromagnetic switch 26 is actuated. The fourth time counter 25 is set a time span of the third predetermined period plus a fourth predetermined period, e.g. 6 seconds+34 seconds, and actuates the contact 28a of the sixth electromagnetic switch 28 to make connection between a line 27 and a line 29 during the time span. After the time span, the sixth electromagnetic switch 28 is shut off to disconnect the lines 27 and 29 until the next time they are actuated. Therefore, during the third predetermined period, the voltage transmitted to the auxiliary high-frequency heating means 71 through the lines 27 and 29 is the third voltage 220 V, while during the fourth predetermined period, the voltage transmitted to the auxiliary high-frequency heating means 71 is the fourth voltage 73.3 V.

Figure 8:
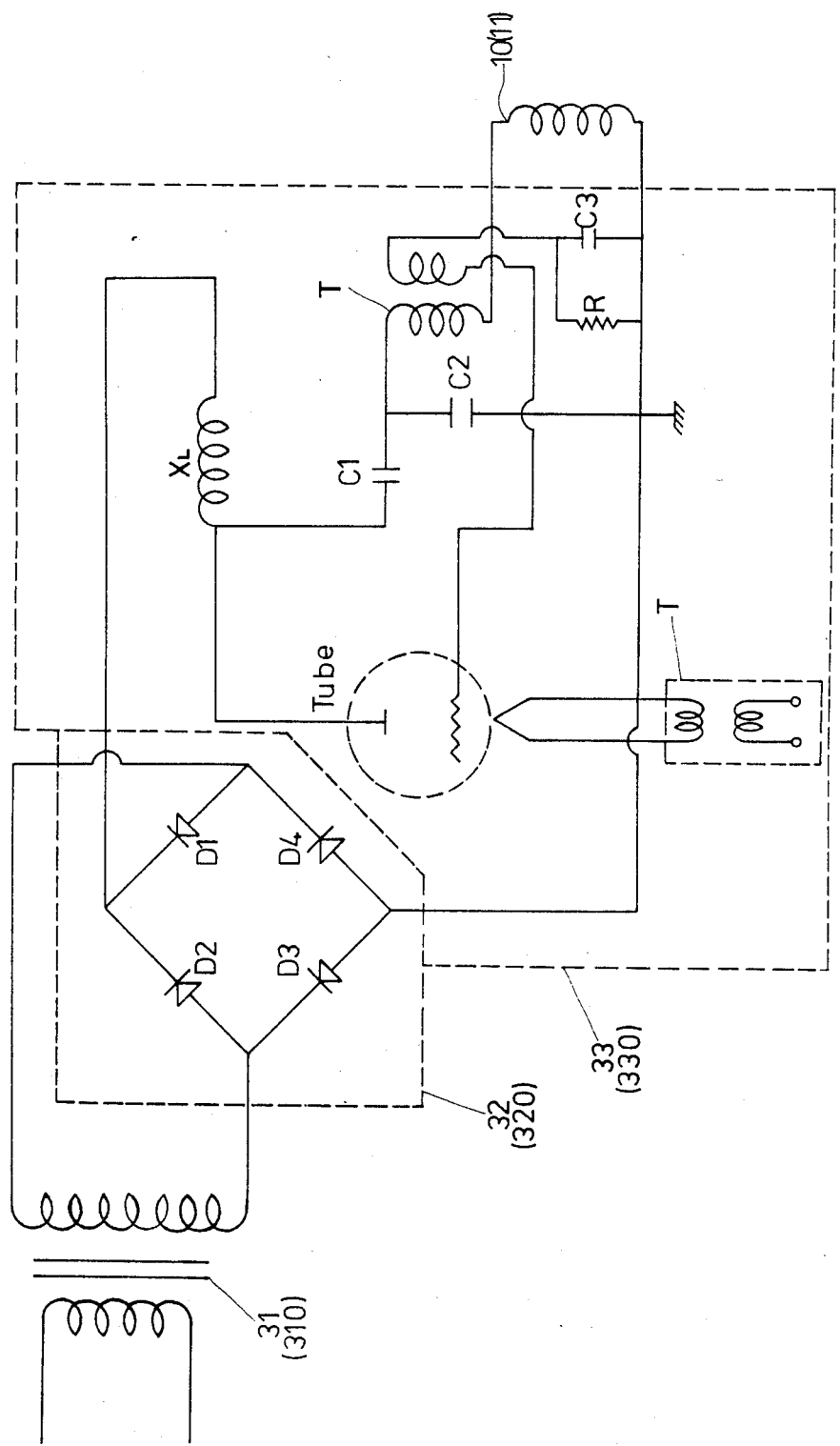
FIG. 8 is an electrical schematic diagram of the main high-frequency heating means and the auxiliary high-frequency heating means.

Referring now to FIGS. 7(a), 7(b), and 8, there are shown the block diagrams and the electrical schematic diagrams of the main high-frequency heating means 70 and the auxiliary high-frequency heating means 71. The main high-frequency heating means 70 includes a first step-up transformer 31, a first bridge rectifier 32 coupled to the first step-up transformer 31, a first high-frequency oscillator 33 coupled to said first bridge rectifier 32, and the main high-frequency induction coil 10 coupled to the first high-frequency oscillator 33. The auxiliary high-frequency heating means 71 is similar to the main high-frequency heating means 70, also including a second step-up transformer 310, a second bridge rectifier 320, a second high-frequency oscillator 330, and the auxiliary high-frequency induction coil 11. Thus, in FIG. 8, merely a single electric circuit is shown to represent both of the main and the auxiliary high-frequency heating means 70 and 71, while the elements of the auxiliary high-frequency heating means 71 are designated by the parenthetical numbers. The first and second step-up transformer 31 and 310 are respectively connected to the lines 20 and 29, and are used to step up the voltages received from the lines 20 and 29 according to a transformation ratio of approximately 220/5000 to 220/10000, and sequentially, to respectively output the stepped-up voltages to the lines 200 and 290. The first and second bridge rectifiers 32 and 320 are used to respectively rectify the stepped-up A.C. voltages from the first and the second step-up transformers 31 and 310 to the D.C. voltages. Each of the first and the second high-frequency oscillators 33 and 330 is a Hartley type oscillator, and is used to oscillate the D.C. voltage from the first or second bridge rectifier 32 or 320 to a high-frequency A.C. voltage; sequentially, send to the main or the auxiliary high-frequency induction coil 10 or 11.

Figures 9A, 9B:
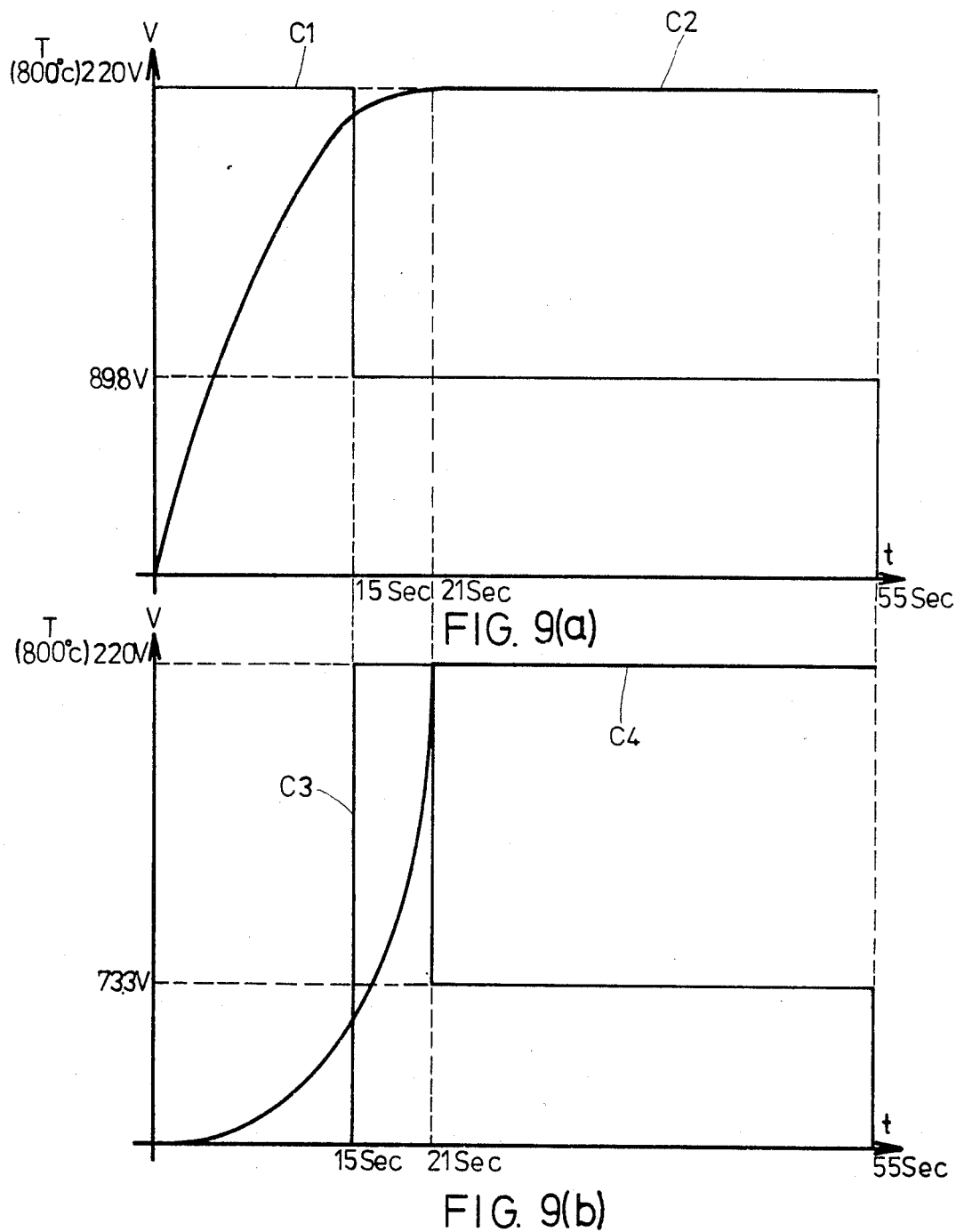
FIG. 9(a) is a graph showing relations among the voltage applied to the main high-frequency heating means and the temperature of the crosspiece versus the time.
FIG. 9(b) is a graph showing relations among the voltage applied to the auxiliary high-frequency heating means and the temperature of the inner surface of the handlebar stem versus the time.

The present invention utilizes the controlling means 50 and 60 to respectively control the voltages applied to the main and auxiliary high-frequency heating means 70 and 71 with two steps. The main reason for controlling the temperature lies in preventing the material of the front fork 12 from deteriorating, from the acceleration of oxygenation on its surfaces, and keeping its grain size from becoming coarse due to a long period of heating with high temperatures. In detail, referring to FIGS. 9(a) and 9(b), the main high-frequency heating means 70 first applies its heating section to the outer surface of the joint 12a with the first voltage 220 V through the first predetermined period of 15 seconds. The first voltage is predetermined high enough to heat the joint 12a and the parts of the weld metal near the inner surface of the joint 12a so they all reach the melting temperature of the weld metal, for example 800° C. of the bronze, at the time the first predetermined period terminates. Sequentially, the main high-frequency heating means 70 applies its heating section to the joint 12a with the second voltage 89.8 V through the second predetermined period of 40 seconds. The second voltage is lower than the first voltage, but it is high enough to maintain the crosspiece 12a at the melting temperature of the weld metal. Therefore, the variation of the temperature of the crosspiece 12a during the heating process is indicated by the curve C1 in FIG. 9(a).

At the time the first predetermined period terminates, the auxiliary high-frequency heating means 71 applies its heating section to the crosspiece 12a from the inner surface of the handlebar stem 12b with the third voltage 220 V through the third predetermined period. The third voltage is predetermined high enough to heat the portions of the handlebar stem 12b inserted into the crosspiece 12a and the parts of the weld metal near the outer surface of the handlebar stem 12b so they all reach the melting temperature of the weld metal at the time the third predetermined period terminates. Sequentially, the auxiliary high-frequency heating means 71 applies its heating section to the crosspiece 12a with the fourth voltage 73.3 V through the fourth predetermined period of 34 seconds. The fourth voltage is lower than the third voltage, but it is high enough to maintain the jointed portions of the handlebar stem 12b at the melting temperature of the weld metal. Thus, the variation of the temperature of the junction between the handlebar stem 12b and the crosspiece 12a during the heating process is indicated by the curve C4 in FIG. 9(b).

Since two heating sections are respectively applied to the outer surface of the crosspiece 12a and the inner surface of the handlebar stem 12b, causing these portions to be heated to approximately simultaneously reach the melting temperature of the weld metal, the weld metal can evenly flow into and cover the junctures between the crosspiece 12a, the handlebar stem 12b, and the fork blades 12c and 12d. It should be noted that the second high-frequency oscillator 330 preferably has a higher oscillating frequency than the first high-frequency oscillator 33 to increase the heating efficiency of the auxiliary high-frequency induction coil 11, because the diameter of the auxiliary high-frequency induction coil 11 is smaller than the minor axis of the main high-frequency induction coil 10.

Figure 10:
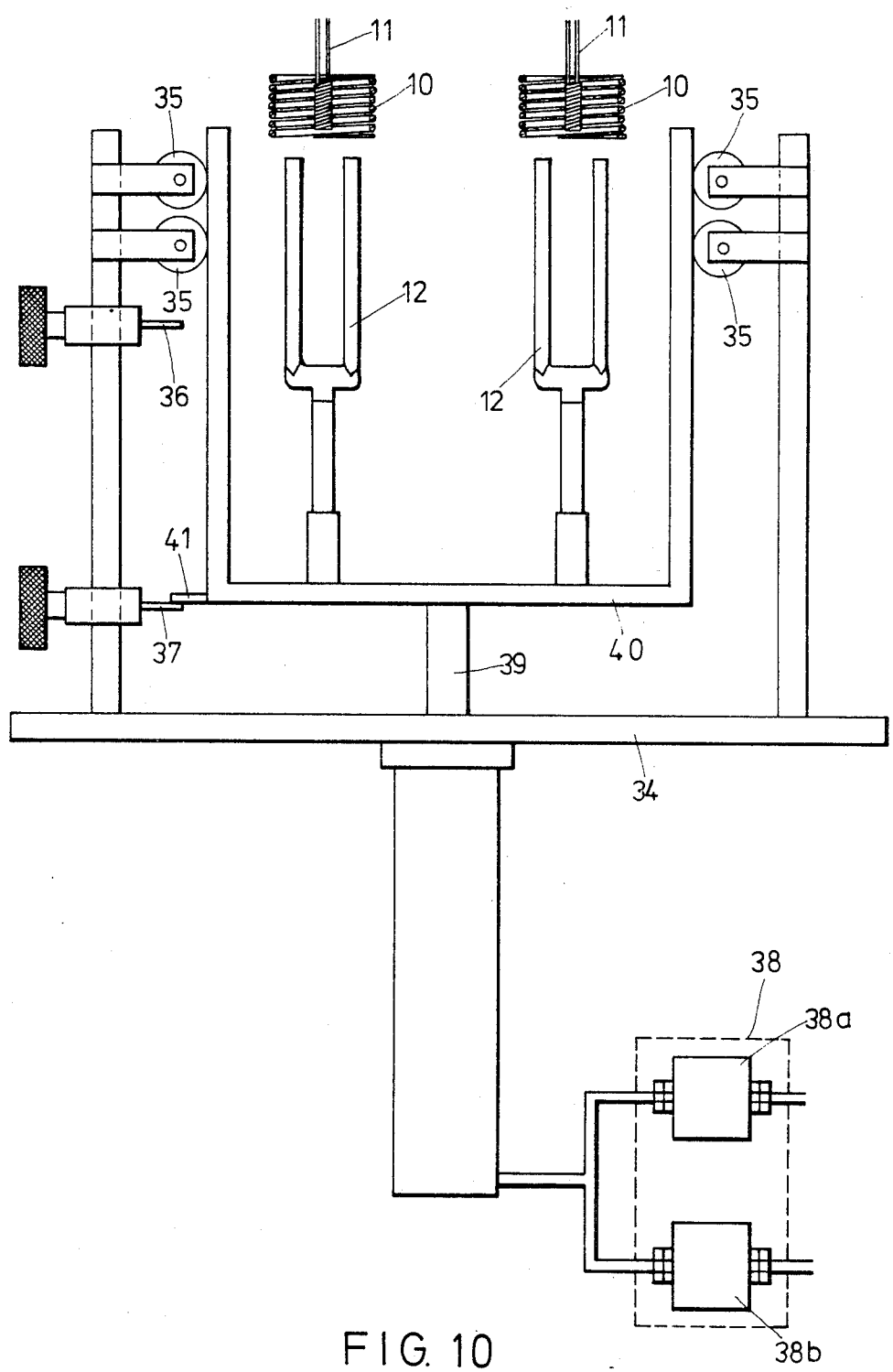
FIG. 10 is a plan view which shows that in a welding apparatus two front forks are ready for being positioned in the main and the auxiliary high-frequency induction coils to be heated.

Referring now to FIG. 10, there is shown two front forks 12 which are located in the high-frequency welding apparatus according to the present invention, and are ready for being sent to the main and auxiliary heating sections. The welding apparatus has a stationary supporter 34 which is formed substantially U-shaped. Two sets of rollers 35 are provided on two sides of the stationary supporter 34, and an upper stopper 36 and a lower stopper 37 are provided along one side of the stationary supporter 34. A hydraulic oil pressure system 38 includes an oil pressure lift valve 38a and an oil pressure relief valve 38b respectively controlling a push rod 39 to rise up and lower down, which is provided in the stationary supporter 34. A movable supporter 40, which is formed substantially U-shaped, is mounted on the upper end of the push rod 39, and its two outer sides abut against the two sets of rollers 35. A projection 41 is provided on one outer side of the movable supporter 40, in accordance with the side the upper and lower stoppers 36 and 37 are provided on, to limit the movement of the movable supporter 40 only between the upper stopper 36 and the lower stopper 37.

Figure 11:
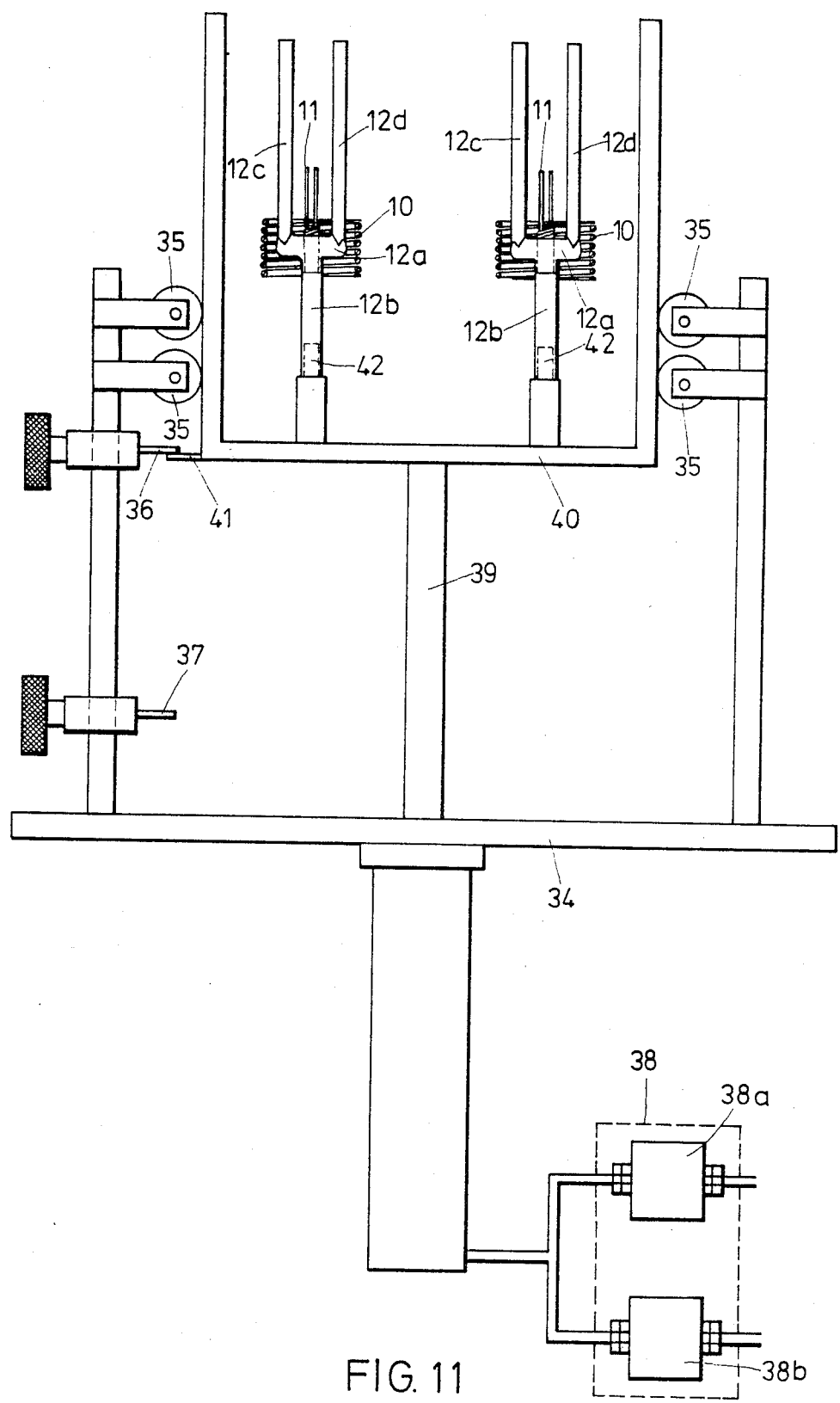
FIG. 11 is a plan view which shows that in the welding apparatus the front fork has been positioned in the heating area of the main and the auxiliary high-frequency induction coils.

In this case, after the front forks 12 are located on the movable supporter 40, the hydraulic oil pressure system 38 actuates the push rod 39 to rise up until the projection 41 reaches the upper stopper 36. At this time, the joint 12a is inserted into the main high-frequency induction coil 10, and the handlebar stem 12b accommodates the auxiliary high-frequency coil 11 therein, therefore the front fork 12 is positioned in the heating position as shown in FIG. 11. After the heating process, the hydraulic oil pressure system 38 actuates the push rod 39 to lower down until the projection 41 reaches the lower stopper 37. In order to keep the front fork steady during the heating process, a circular protrusion 42, which diameter is slightly less than the inner diameter of the handlebar stem 12b, is provided on the movable supporter 40, and extends upward for the handlebar stem 12b to be tightly fixed thereon.

It should be noted that according to various specifications of the front fork, the first to fourth voltages and the first to fourth predetermined periods can be changed into any values, and the two-stepped controlling means also can be modified into a controlling means with any number of steps. While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims which scope is to be accorded the broadest interpretation so as to emcompass all such modification and equivalent structures.

What I claim is:

1. A method for welding the joint of the front fork of a bicycle, which includes a hollow crossbar at the joint, said crosspiece having a central bore, two end openings thereon and a weld metal therein, a hollow handlebar stem having its one end loosely fitted in said bore, and two fork blades each having one end in said openings respectively, comprising the steps of:
   (1) applying a main high-frequency heating means to said joint from the outer surface of said crosspiece; and
   (2) applying an auxiliary high-frequency heating means to said joint from the inner surface of said handlebar stem whereby said auxiliary and said main induction welding heating means cooperates to provide symmetrical heating of the joint thereby preventing overflow defects in the weld.

2. The method as claimed in claim 1, wherein said step (1) comprises the steps of:
   applying a main high-frequency heating means to said joint from the outer surface of said crosspiece with a first voltage through a first predetermined period; and
   when said first predetermined period terminates, applying said main high-frequency heating means to said joint from the outer surface of said crosspiece with a second voltage through a second predetermined period.

3. The method as claimed in claim 2, wherein said step (2) comprises the steps of:
   when said first predetermined period terminates, applying an auxiliary high-frequency heating section to said joint from the inner surface of said handlebar stem with a third voltage through a third predetermined period; and
   when said third predetermined period terminates, applying said auxiliary high-frequency heating section to said joint from the inner surface of said handlebar stem with a fourth voltage through a fourth predetermined period.

4. The method as claimed in claim 3, wherein said first voltage is high enough to heat said joint and the parts of said weld metal near the inner surface of said joint so that all parts reach the melting temperature of said weld metal at the time said first predetermined period terminates.

5. The method as claimed in claim 4, wherein said third voltage is high enough to heat the portion of said handlebar stem inserted into said crosspiece and the parts of said weld metal near the outer surface of said handlebar stem so that all parts reach the melting temperature of said weld metal at the time said third predetermined period terminates.

6. The method as claimed in claim 5, wherein said second voltage is lower than said first voltage, but is high enough to maintain said crosspiece at the melting temperature of said weld metal.

7. The method as claimed in claim 6, wherein said fourth voltage is lower than said third voltage, but is high enough to maintain said handlebar stem at the melting temperature of said weld metal.

8. The method as claimed in claim 7, wherein said weld metal is an alloy of copper.

9. In a heating apparatus for welding the joint of the front fork of a bicycle, which includes a hollow crosspiece at the joint, said crosspiece having a central bore, two end openings thereon and a weld metal therein, a hollow handlebar stem having its one end less tightly fixed in said bore, and two fork blades having an end less tightly fixed in said openings respectively, said apparatus adapted for use with an induction welding power source comprising:
   a main high-frequency induction welding heating means adapted to be coupled to the power source for heating said joint from the outer surface of said crosspiece; and
   an auxiliary high-frequency induction welding heating means adapted to be coupled to the power source, for being inserted into said handlebar stem for heating said joint from the inner surface of said handlebar stem whereby said auxiliary and said main induction welding heating means cooperate to provide symmetrical heating of the joint, thereby preventing overflow defects in the weld.

10. The apparatus as claimed in claim 9, further comprising:
a first means for controlling said main high-frequency heating means to heat said crosspiece with a first voltage through a first predetermined period, and then with a second voltage through a second predetermined period, coupled to said main high-frequency heating means and said power source respectively; and
a second means for controlling said auxiliary high-frequency heating means to heat said crosspiece with a third voltage through a third predetermined period, and then with a fourth voltage through a fourth predetermined period, coupled to said auxiliary high-frequency heating means and said power source respectively.

11. The apparatus as claimed in claim 10, wherein said second controlling means controls said auxiliary high-frequency heating means beginning to heat said crosspiece when said first predetermined period terminates.

12. The apparatus as claimed in claim 11, wherein said first voltage is high enough to heat said crosspiece and the parts of said weld metal near the inner surface of said joint so that all reach the melting temperature of said weld metal at the time said first predetermined period terminates; and said second voltage is lower than said first voltage in order to maintain said crosspiece at the melting temperature of said weld metal.

13. The apparatus as claimed in claim 12, wherein said third voltage is high enough to heat the portion of said handlebar stem inserted into said crosspiece and the parts of said weld metal near the outer surface of said handlebar stem so that all reach the melting temperature of said weld metal at the time said third predetermined period terminates; and said fourth voltage is lower than said third voltage in order to maintain said handlebar stem at the melting temperature of said weld metal.

14. The apparatus as claimed in claim 13, wherein said weld metal is an alloy of copper.

15. The apparatus as claimed in claim 14, wherein said first controlling means comprises:
a first transformer having a first primary winding and a first secondary winding with a first central tap, coupled to said power source for providing said first voltage at said first secondary winding and said second voltage at said first central tap;
a second electromagnetic switch connected between said first secondary winding and said first central tap;
a third electromagnetic switch coupled between said second electromagnetic switch and said main high-frequency heating means;
a first time counter coupled to said second electromagnetic switch for controlling said second electromagnetic switch to firstly switch to said first secondary winding when the power begins supplying, and then switch to said first central tap after said first predetermined period; and
a second time counter coupled to said third electromagnetic switch for controlling said third electromagnetic switch to switch on for the total times of said first and second predetermined periods.

16. The apparatus as claimed in claim 15, wherein said main high-frequency heating means comprises a first step-up transformer coupled to said third electromagnetic switch, a first bridge rectifier coupled to said first step-up transformer, a first high-frequency oscillator coupled to said first bridge rectifier, and a main high-frequency induction coil coupled to said first high-frequency oscillator.

17. The apparatus as claimed in claim 16, wherein said second controlling means comprises:
a second transformer having a second primary winding and a second secondary winding with a second central tap, coupled to said power source for providing said third voltage at said second secondary winding and said fourth voltage at said second central tap;
a fifth electromagnetic switch connected between said second secondary winding and said second central tap;
a sixth electromagnetic switch coupled between said second electromagnetic switch and said auxiliary high-frequency heating means;
a third time counter coupled to said fifth electromagnetic switch for controlling said fifth electromagnetic switch to firstly switch to said second secondary winding when the power begins supplying, and then switch to said second central tap after said third predetermined period; and
a fourth time counter coupled to said sixth electromagnetic switch for controlling said sixth electromagnetic switch to switch on for the total times of said third and fourth predetermined periods.

18. The apparatus as claimed in claim 17, wherein said auxiliary high-frequency heating means comprises a second step-up transformer coupled to said sixth electromagnetic switch, a second bridge rectifier coupled to said second step-up transformer, a second high-frequency oscillator coupled to said second crosspiece rectifier, and an auxiliary high-frequency induction coil coupled to said second high-frequency oscillator.

19. The apparatus as claimed in claim 18, wherein each of said first and second high-frequency oscillator is a Hartley type oscillator.

20. The apparatus as claimed in claim 19, wherein said second high-frequency oscillator has a higher oscillating frequency than said first high-frequency oscillator.

21. Heating apparatus as claimed in claim 9 wherein said main induction welding heating means is elliptical and said auxiliary induction welding heating means is substantially circular, the diameter of the substantially circular cross section of said auxiliary means being smaller than the minor axis of the comparable elliptical cross section of said main means thereby permitting said auxiliary means to be inserted in said main means.

* * * * *